United States Patent
Novo Diaz et al.

(10) Patent No.: US 12,038,910 B2
(45) Date of Patent: Jul. 16, 2024

(54) METHOD AND SYSTEM FOR REDUCING THE SIZE OF A BLOCKCHAIN

(71) Applicant: Telefonaktiebolaget LM Ericsson (publ), Stockholm (SE)

(72) Inventors: Oscar Novo Diaz, Helsinki (FI); Valentin Tudor, Täby (SE); Aitor Hernandez Herranz, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 17/289,912

(22) PCT Filed: Nov. 28, 2018

(86) PCT No.: PCT/EP2018/082760
§ 371 (c)(1),
(2) Date: Apr. 29, 2021

(87) PCT Pub. No.: WO2020/108742
PCT Pub. Date: Jun. 4, 2020

(65) Prior Publication Data
US 2021/0406250 A1    Dec. 30, 2021

(51) Int. Cl.
*G06F 16/23*    (2019.01)
*G06F 16/27*    (2019.01)
(Continued)

(52) U.S. Cl.
CPC ......... *G06F 16/2379* (2019.01); *G06F 16/27* (2019.01); *H04L 9/3239* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 2018/0323963 A1* | 11/2018 | Stollman | H04L 9/3236 |
| 2019/0141048 A1* | 5/2019 | Fallah | H04L 9/0643 |
| 2022/0116223 A1* | 4/2022 | Zamani | H01B 7/295 |

FOREIGN PATENT DOCUMENTS

| | | |
|---|---|---|
| WO | 2017/006134 A1 | 1/2017 |
| WO | 2017/006136 A1 | 1/2017 |
| WO | 2018/103850 A1 | 6/2018 |

OTHER PUBLICATIONS

Amelchenko et al., "Blockchain Abbreviation Implemented by Message Passing and Shared Memory", 2017 (Year: 2017).*

(Continued)

*Primary Examiner* — Yu Zhao
(74) *Attorney, Agent, or Firm* — NICHOLSON DE VOS WEBSTER & ELLIOTT LLP

(57) ABSTRACT

A method and a system for reducing the size of a blockchain. The blockchain includes a first set of two or more blocks including an initial genesis block. A new genesis block for the blockchain is generated. The first hash value resulting from hashing the new genesis block matches a second hash value resulting from hashing a last block from the first set of blocks, and the difficulty of determining the first hash value is computationally greater than the cumulative difficulty of determining hash values of all blocks in the first set of blocks. The new genesis block is transmitted to one or more blockchain nodes of a blockchain network, and the first set of blocks is replaced with the new genesis block.

18 Claims, 8 Drawing Sheets

(51) Int. Cl.
    *H04L 9/32*     (2006.01)
    *H04L 9/00*     (2022.01)

(56) References Cited

OTHER PUBLICATIONS

Amelchenko et al., "Blockchain Abbreviation: Implemented by Message Passing and Shared Memory", 2017 IEEE 16th International Symposium on Network Computing and Applications (NCA), Oct. 30, 2017, 7 pages.
Ateniese et al., "Redactable Blockchain—or—Rewriting History in Bitcoin and Friends", International Association for Cryptologic Research (IACR), May 2017, 38 pages.
Bruce, J.D., "Purely P2P Crypto-Currency With Finite Mini-Blockchain", Bitfreak Info, Rev. 1, May 2013, 15 pages.
Bruce, J.D., "The Mini-Blockchain Scheme", Cryptonite, Available online at <http://cryptonite.info/files/mbc-scheme-rev3.pdf>, Rev. Jul. 2, 2014, Rev. Mar. 3, 2017, 13 pages.
Github, "Bitcoin—fix openssl linkage problems", Available Online at <https://github.com/bitcoin/bitcoin/commit/a30b56ebe76ffff9f9cc8a6667186179413c6349>, Jul. 15, 2010, 4 pages.
International Search Report and Written Opinion, PCT App. No. PCT/EP2018/082760, Jul. 30, 2019, 10 pages.
Raynovich, Scott, "A Clear Path to Blockchain in Telecom", Light Reading, Available online at <https://www.lightreading.com/blockchain/a-clear-path-to-blockchain-in-telecom/a/d-id/745784>, Sep. 4, 2018, 10 pages.
Office Action, EP App. No. 18811232.0, May 11, 2023, 6 pages.
Crosby, et al., "BlockChain Technology: Beyond Bitcoin", Pantas and Ting Sutardja Center for Entrepreneurship & Technology, Berkeley Engineering, Technical Report, Oct. 16, 2015, 35 pages.
Drescher, "Blockchain Basics: a Non-Technical Introduction in 25 Steps", Apress, 2017, 250 pages.
Nanayakkara, "Blockchain Mining Difficulty", Geveo Australia, Aug. 25, 2017, 7 pages.
Yaga, et al., "Blockchain Technology Overview", National Institute of Standards and Technology (NIST), U.S. Department of Commerce, NISTIR 8202, Oct. 2018, 68 pages.

* cited by examiner

```
┌─────────────────────────────────────────────────────────────────────────┐
│  GENERATE A NEW GENESIS BLOCK FOR THE BLOCKCHAIN, WHERE A FIRST HASH    │
│  VALUE RESULTING FROM HASHING THE NEW GENESIS BLOCK MATCHES A SECOND    │
│  HASH VALUE RESULTING FROM HASHING THE LAST BLOCK FROM THE FIRST SET OF │
│  BLOCKS, AND WHERE THE DIFFICULTY OF DETERMINING THE FIRST HASH VALUE IS│
│  COMPUTATIONALLY GREATER THAN THE CUMULATIVE DIFFICULTY OF DETERMINING  │
│  HASH VALUES OF ALL BLOCKS IN THE FIRST SET OF BLOCKS                   │
│                                   210                                    │
└─────────────────────────────────────────────────────────────────────────┘
                                    │
                                    ▼
┌─────────────────────────────────────────────────────────────────────────┐
│   TRANSMIT THE NEW GENESIS BLOCK TO ONE OR MORE BLOCKCHAIN NODES OF     │
│                        THE BLOCKCHAIN NETWORK                            │
│                                   220                                    │
└─────────────────────────────────────────────────────────────────────────┘
                                    │
                                    ▼
┌─────────────────────────────────────────────────────────────────────────┐
│         REPLACE THE FIRST SET OF BLOCKS WITH THE NEW GENESIS BLOCK      │
│                                   230                                    │
│  ┌───────────────────────────────────────────────────────────────────┐  │
│  │ WHERE RESPONSIVE TO DETERMINING THAT THE LIST OF BLOCKS INCLUDES  │  │
│  │ A SECOND SET OF BLOCKS INCLUDING ONE OR MORE BLOCKS: A) PRIOR TO  │  │
│  │ THE REPLACING OF THE FIRST SET OF BLOCKS WITH THE NEW GENESIS     │  │
│  │ BLOCK, A FIRST BLOCK FROM THE SECOND SET OF BLOCKS IS LINKED TO   │  │
│  │ THE LAST BLOCK FROM THE FIRST SET OF BLOCKS BY THE CRYPTOGRAPHIC  │  │
│  │ MECHANISM, AND B) FOLLOWING THE REPLACING OF THE FIRST SET OF     │  │
│  │ BLOCKS WITH THE NEW GENESIS BLOCK, THE FIRST BLOCK FROM THE       │  │
│  │ SECOND SET OF BLOCKS IS LINKED TO THE NEW GENESIS BLOCK BY THE    │  │
│  │ CRYPTOGRAPHIC MECHANISM                                           │  │
│  │                              232                                  │  │
│  └───────────────────────────────────────────────────────────────────┘  │
└─────────────────────────────────────────────────────────────────────────┘
```

FIG. 2

GENERATE A NEW GENESIS BLOCK FOR THE BLOCKCHAIN, WHERE A FIRST HASH VALUE RESULTING FROM HASHING THE NEW GENESIS BLOCK MATCHES A SECOND HASH VALUE RESULTING FROM HASHING THE LAST BLOCK FROM THE FIRST SET OF BLOCKS, AND WHERE THE DIFFICULTY OF DETERMINING THE FIRST HASH VALUE IS COMPUTATIONALLY GREATER THAN THE CUMULATIVE DIFFICULTY OF DETERMINING HASH VALUES OF ALL BLOCKS IN THE FIRST SET OF BLOCKS
210

ADD TO THE GENESIS BLOCK A SET OF ONE OR MORE TRANSACTIONS FROM THE FIRST SET OF BLOCKS
310

WHERE THE FIRST SET OF ONE OR MORE TRANSACTIONS INCLUDES AT LEAST ONE TRANSACTION FROM EACH BLOCK FROM THE FIRST SET OF BLOCKS
315

WHERE THE NUMBER OF TRANSACTIONS IN THE NEW GENESIS BLOCK IS A NUMBER PREDEFINED BY THE BLOCKCHAIN NETWORK
320

DETERMINE A NUMBER OF TRANSACTIONS TO BE ADDED IN THE NEW GENESIS BLOCK
325

DETERMINE THAT THE NUMBER OF TRANSACTIONS OF THE NEW GENESIS BLOCK IS COMPLIANT WITH A POLICY OF THE BLOCKCHAIN NETWORK
330

FIG. 3

GENERATE A NEW GENESIS BLOCK FOR THE BLOCKCHAIN, WHERE A FIRST HASH VALUE RESULTING FROM HASHING THE NEW GENESIS BLOCK MATCHES A SECOND HASH VALUE RESULTING FROM HASHING THE LAST BLOCK FROM THE FIRST SET OF BLOCKS, AND WHERE THE DIFFICULTY OF DETERMINING THE FIRST HASH VALUE IS COMPUTATIONALLY GREATER THAN THE CUMULATIVE DIFFICULTY OF DETERMINING HASH VALUES OF ALL BLOCKS IN THE FIRST SET OF BLOCKS
210

DETERMINE A NONCE
410

HASH THE NEW GENESIS BLOCK INCLUDING THE NONCE TO OBTAIN THE FIRST HASH VALUE
415

DETERMINE THAT THE FIRST HASH VALUE MATCHES THE SECOND HASH VALUE
420

DETERMINE THAT A FIRST SET OF N CONSECUTIVE DIGITS OF THE FIRST HASH VALUE EQUALS A SECOND SET OF N CONSECUTIVE DIGITS OF THE SECOND HASH VALUE
425

FIG. 4

```
┌─────────────────────────────────────────────────────────────────────────────┐
│       GENERATE A NEW GENESIS BLOCK FOR THE BLOCKCHAIN, WHERE A FIRST HASH VALUE       │
│     RESULTING FROM HASHING THE NEW GENESIS BLOCK MATCHES A SECOND HASH VALUE          │
│   RESULTING FROM HASHING THE LAST BLOCK FROM THE FIRST SET OF BLOCKS, AND WHERE THE   │
│     DIFFICULTY OF DETERMINING THE FIRST HASH VALUE IS COMPUTATIONALLY GREATER THAN THE│
│      CUMULATIVE DIFFICULTY OF DETERMINING HASH VALUES OF ALL BLOCKS IN THE FIRST SET OF│
│                                        BLOCKS                                         │
│                                          210                                          │
│                                                                                       │
│   ┌───────────────────────────────────────────────────────────────────────────────┐   │
│   │    WHERE THE NUMBER OF BLOCKS IN THE FIRST SET OF BLOCKS IS A NUMBER          │   │
│   │              PREDEFINED BY THE BLOCKCHAIN NETWORK                             │   │
│   │                                  510                                          │   │
│   └───────────────────────────────────────────────────────────────────────────────┘   │
│                                                                                       │
│   ┌───────────────────────────────────────────────────────────────────────────────┐   │
│   │   DETERMINE A NUMBER OF BLOCKS FROM THE BLOCKCHAIN TO BE INCLUDED IN THE      │   │
│   │                          FIRST SET OF BLOCKS                                  │   │
│   │                                  520                                          │   │
│   │   ┌───────────────────────────────────────────────────────────────────────┐   │   │
│   │   │   THE NUMBER OF BLOCKS IN THE FIRST SET OF BLOCKS IS GREATER THAN A   │   │   │
│   │   │   MINIMUM NUMBER OF BLOCKS THAT CAN BE REPLACED IN THE BLOCKCHAIN     │   │   │
│   │   │                              NETWORK                                  │   │   │
│   │   │                                525                                    │   │   │
│   │   └───────────────────────────────────────────────────────────────────────┘   │   │
│   └───────────────────────────────────────────────────────────────────────────────┘   │
└─────────────────────────────────────────────────────────────────────────────┘
                                          │
                                          ▼
┌─────────────────────────────────────────────────────────────────────────────┐
│   TRANSMIT THE NEW GENESIS BLOCK TO ONE OR MORE BLOCKCHAIN NODES OF THE BLOCKCHAIN    │
│                                       NETWORK                                         │
│                                         220                                           │
│   ┌───────────────────────────────────────────────────────────────────────────────┐   │
│   │   TRANSMIT A TRANSACTION MESSAGE INCLUDING THE NEW GENESIS BLOCK AND AN       │   │
│   │   INDICATION OF THE NUMBER OF BLOCKS IN THE FIRST SET OF BLOCKS THAT ARE TO   │   │
│   │                     BE REPLACED BY THE NEW GENESIS BLOCK                      │   │
│   │                                    530                                        │   │
│   └───────────────────────────────────────────────────────────────────────────────┘   │
└─────────────────────────────────────────────────────────────────────────────┘
```

FIG. 5

METHOD AND SYSTEM FOR REDUCING THE SIZE OF A BLOCKCHAIN

CROSS-REFERENCE TO RELATED APPLICATIONS

This application is a National stage of International Application No. PCT/EP2018/082760, filed Nov. 28, 2018, which is hereby incorporated by reference.

TECHNICAL FIELD

Embodiments of the invention relate to the field of distributed ledger technology; and more specifically, to mechanisms for reducing the size of a blockchain.

BACKGROUND

A blockchain system is a platform used for building, running, and deploying a decentralized, distributed and public distributed digital ledger. A blockchain permanently records, in a verifiable way, digital records of transactions that occur between two parties. The records cannot be altered retroactively without the alteration of all subsequent blocks and the consensus of the network. This allows the participants to verify and audit transactions inexpensively. A blockchain is maintained without a central authority or implementation. A blockchain includes blocks, which are linked and secured using cryptographic mechanisms.

The information in blockchain systems is always incrementally added to the blockchain and it is never removed making the blockchain size to constantly grow. This causes a problem that is inherent to most blockchain systems called the 'bloat problem'.

In some scenarios, the information stored in the blockchain needs to be kept permanently for currency consistency (for example to prevent double spending). However, in other scenarios, it is not required to keep the information permanently. For instance, in some scenarios the blockchain system is used to track information about perishable products for short periods of time or used to record smart contracts between parties that may expire or become obsolete. In these exemplary scenarios, it is not needed to keep all information recorded in the blockchain permanently.

SUMMARY

One general aspect includes a method for reducing the size of a blockchain, where the blockchain includes a first set of two or more blocks including an initial genesis block, the method including: generating a new genesis block for the blockchain, where a first hash value resulting from hashing the new genesis block matches a second hash value resulting from hashing a last block from the first set of blocks, and where the difficulty of determining the first hash value is computationally greater than the cumulative difficulty of determining hash values of all blocks in the first set of blocks; transmitting the new genesis block to one or more blockchain nodes of a blockchain network; and replacing the first set of blocks with the new genesis block.

One general aspect includes an apparatus for reducing the size of a blockchain, where the blockchain includes a first set of two or more blocks including an initial genesis block, the apparatus including: one or more processors; and a computer memory storing a set of computer readable instructions that when executed by the one or more processors cause the apparatus to: generate a new genesis block for the blockchain, where a first hash value resulting from hashing the new genesis block matches a second hash value resulting from hashing a last block from the first set of blocks, and where the difficulty of determining the first hash value is computationally greater than the cumulative difficulty of determining hash values of all blocks in the first set of blocks; transmit the new genesis block to one or more blockchain nodes of a blockchain network; and replace the first set of blocks with the new genesis block.

BRIEF DESCRIPTION OF THE DRAWINGS

The invention may best be understood by referring to the following description and accompanying drawings that are used to illustrate embodiments of the invention. In the drawings:

FIG. 2 illustrates a flow diagram of exemplary operations for reducing the size of a blockchain, in accordance with some embodiments.

FIG. 3 illustrates a flow diagram of exemplary operations for generating a new genesis block, in accordance with some embodiments.

FIG. 4 illustrates a flow diagram of exemplary operations for generating a new genesis block, in accordance with some embodiments.

FIG. 5 illustrates a flow diagram of exemplary operations for generating a new genesis block, in accordance with some embodiments.

DETAILED DESCRIPTION

Figure 1A:
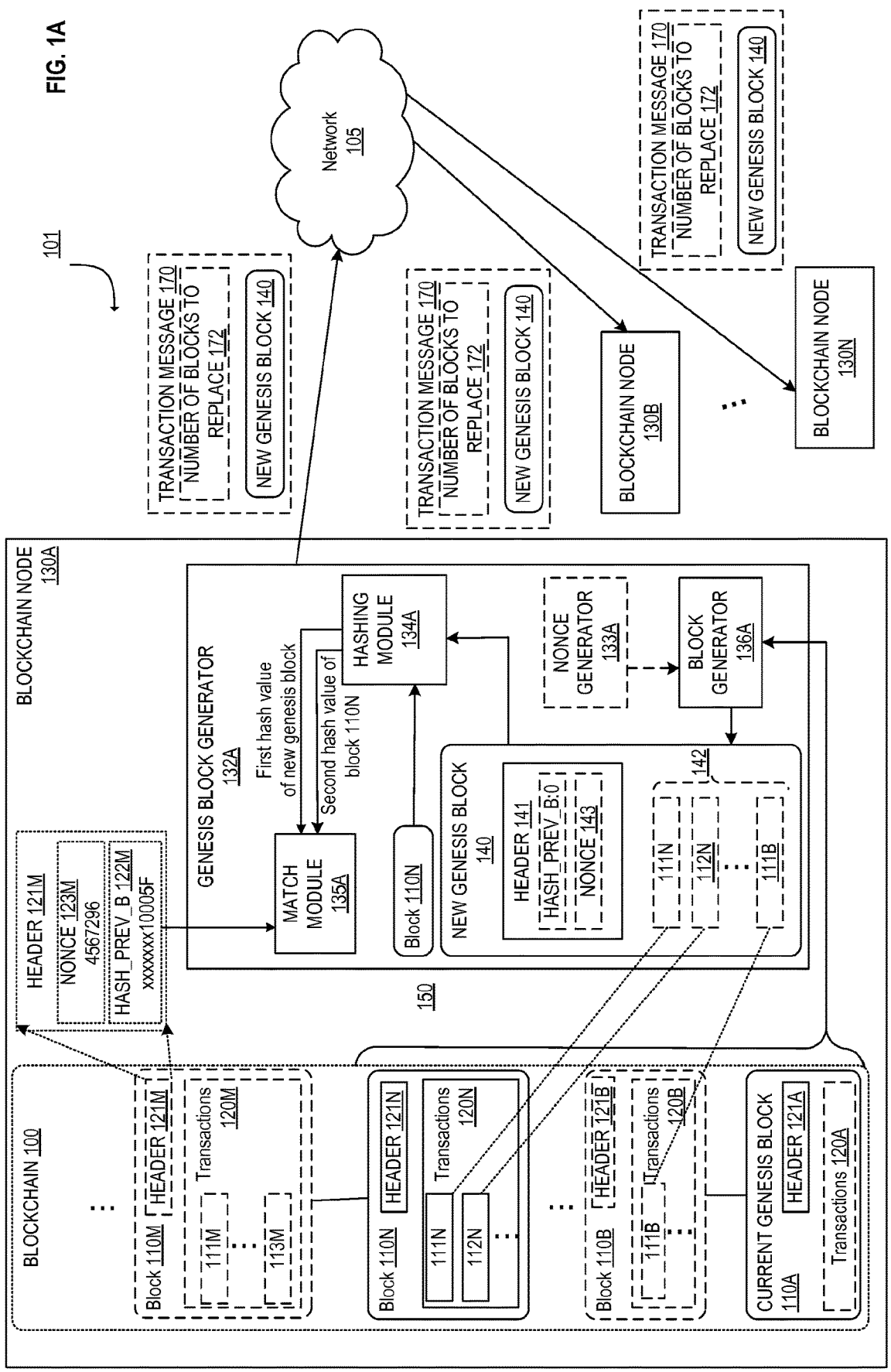
FIG. 1A illustrates a block diagram of an exemplary blockchain network in which generation of a new genesis block is enabled, in accordance with some embodiments.

The following description describes methods and apparatus for reducing the size of a blockchain. In the following description, numerous specific details such as logic implementations, operation codes (opcodes), means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Having a large blockchain size is a known problem. A number of solutions to the bloat problem exist. A first existing technique for reducing the size of a large blockchain defines a new block called a 'reincarnation block'. The reincarnation blocks are created and included to the blockchain when a pre-defined condition is satisfied. The reincarnation blocks are associated with expiration times. When the expiration time is reached, a reincarnation block is selected and preceding the reincarnation block are deleted from the blockchain. This solution requires a definition of a new type of blocks as well as the monitoring of the expiration time and/or the predefined condition that is to be met by the blockchain.

A second existing solution may be referred to as the mini-blockchain. The mini-blockchain is a finite blockchain that stores the transaction balance of all non-empty addresses in a new structure called 'account tree'. In addition, this solution prunes the blocks older than a certain amount of time. All the blocks remain in the blockchain, but the transactions are removed from each block leaving the headers of each block. This means all nodes can still use the chain of block headers to verify the best mini-blockchain with the highest cumulative difficulty. This technique focuses on providing a solution for economic transactions. This solution is required to keep all the blocks and to use a pruning technique with the old blocks. The solution is also required to have an additional data structure "account tree" to keep the balance of the transactions.

The solutions mentioned above have several disadvantages. For example, these solutions require the blockchain nodes to generate a new type of blocks or to generate and update an additional data structure resulting in additional processing burden and operating complexity on these nodes. Further some solutions rely on a fixed timeout to trigger the reduction in size of the blockchain. There is a need for an efficient solution of reducing the size of a blockchain.

This invention describes a method and a system for reducing the size of a blockchain. The blockchain includes a first set of two or more blocks including an initial genesis block. A new genesis block for the blockchain is generated. The first hash value resulting from hashing the new genesis block matches a second hash value resulting from hashing a last block from the first set of blocks, and the difficulty of determining the first hash value is computationally greater than the cumulative difficulty of determining hash values of all blocks in the first set of blocks. The new genesis block is transmitted to one or more blockchain nodes of a blockchain network, and the first set of blocks is replaced with the new genesis block.

The embodiments described herein present a solution where a new genesis block is generated and it replaces a set of two or more blocks in a blockchain. The techniques proposed herein solve the bloat problem by replacing N blocks and the genesis block of the blockchain with a new genesis block. In some embodiments, the new genesis block contains a fraction of all transactions stored in those N blocks. This reduces the size of the blockchain and keep its length bounded to a fixed number of total blocks. The solution presented herein eliminates the oldest information stored in the blockchain and use the consensus mechanism to generate and add a new genesis block. The new genesis block is added based on a mechanism that allows peers in the blockchain network to verify its validity.

The solution reduces the size of a blockchain, making the blockchain more suitable for scenarios involving constrained devices. For example, the solution can be used in networks including network devices with limited capabilities such as devices used in Internet of Things (IoT) environments. The invention described herein present several advantages when compared with existing solutions. For example, in contrast to the existing solutions, the solution does not require updates or modifications of the blockchain nodes of the blockchain system. Another advantage of the solution is that it offers a high level of scalability which results in a better performance when exchanging the information between the blockchain nodes, improving storage capabilities and bandwidth. In addition, the proposed solution allows node in the blockchain network acting as a miner to trigger the creation of a new node in the blockchain at any time. This is a clear advantage when compared to the other existing solutions. Thus, as opposed to the existing solutions the operations performed for reducing the size can be performed at any point in time.

FIG. 1A illustrates a block diagram of an exemplary blockchain network 101 in which generation of a new genesis block is enabled, in accordance with some embodiments.

The blockchain network 101 includes a set of one or more blockchain nodes 130A-N that are coupled through a network 105. Blockchain node 130A is operative to generate a new genesis block. The blockchain node 130A stores the blockchain 100 and includes the genesis block generator 132A. The blockchain 100 includes blocks 110A-110N that include a current genesis block 110A and optional additional block 110M. In some embodiments, the blockchain includes only the set of blocks 110A-N (which are to be replaced by a new genesis block), while in other embodiments, the blockchain 100 also includes the additional block 110M that is linked with the last block 110N of the blocks that are to be replaced. The first set of blocks includes N blocks that can be two or more blocks.

Each block from the set 110A-N and optional block 110M includes a respective header 121A-M and a set of zero or more transactions. For example, the blocks 110B-M includes respective sets of transactions 120B-M, where 120B includes transaction 111B and zero or more other transactions, transactions 120N includes transaction 111N and transaction 112N and potentially additional zero or more transactions, and transactions 120M includes a set of transaction 111M-113M. The current genesis block 110A can be a genesis block created when the blockchain is first initialized. In other words, the genesis block can be the original genesis block of the blockchain. Alternatively, the current genesis block 110A can be a genesis block that previously replaced a set of two or more blocks from the blockchain according to the mechanisms described with reference to one or a combination of FIGS. 1A, 2-5. In contrast to blocks 110B-110N and optional block 110M, the current genesis block 110A may or may not include transactions. In one embodiment, where the current genesis block 110A is the initial genesis block of the blockchain 100, the current genesis block 110A does not include any transactions. In an alternative embodiment, where the current genesis block 110A is a block that replaced a set of blocks of the blockchain, the current genesis block 110A may include a set of transactions 120A that were previously included in the replaced blocks. Each transaction represents operations on accounts that are part of the blockchain system.

The genesis block generator 132A is operative to generate a new genesis block 140 that is to replace two or more blocks of the blockchain 100. In the illustrated example, N blocks 150 (110A-110N) are to be replaced by the new genesis block 140. Generating the new genesis block 140 is computationally expensive and several criteria need to be satisfied for the new genesis block to be accepted in the blockchain 100. The new genesis block is such that a first hash value resulting from hashing the new genesis block matches a second hash value resulting from hashing a last block from the first set of blocks, and the difficulty of determining the first hash value is computationally greater than the cumulative difficulty of determining hash values of all blocks in the first set of blocks.

In some embodiments, the generation of the new genesis block is triggered by the blockchain node 130A at any given time. This decision to trigger the generation can be based on a potential reward that the blockchain node 130A is to get upon completion of the generation of the new genesis block. For example, when the blockchain node 130A determines that the new genesis block can be generated to obtain a highest reward from the blockchain network, using less effort, the blockchain node 130A triggers the generation.

The new genesis block 140 is generated through an iterative process where the block generator 136A generates a block. The hashing module 134A determines a hash value of the generated block and determines a second hash value of the last block 110N of the set of blocks to be replaced. The match module 135A determines whether the first hash value matches the second hash value. In addition, the match module 135A determines whether the difficulty of determining the first hash value of the generated block is computationally greater than the cumulative difficulty of determining hash values of all blocks 110A-N in the first set of blocks. This process is repeated with different generated blocks that result in different first hash values until the match between the first hash value of the generated block and the second hash value of the last block 110N is confirmed. Once the hashing condition is satisfied the generated block is output as a new genesis block (e.g., block 140).

In some embodiments, the generation of the new genesis block is performed by varying a nonce value to obtain a desired outcome for the hash value of the new genesis block. In these embodiments, the genesis block generator 132A includes a nonce generator 133A. The nonce generator 133A determines a nonce 143 to be included in a header of the new genesis block 140. The hashing module 134A hashes the new genesis block 140 including the nonce 143 to obtain the first hash value and the match module 135A determines whether the first hash value resulting from the hashing of the new genesis block 140 with the nonce 143 matches the second hash value that results from the hashing of the last block 110N of the set of blocks that is to be replaced.

The nonce is a parameter that is varied by the blockchain node until the conditions for generation of the new genesis block is obtained. For example, the nonce can be a value starting at an initial value (e.g., 0) and incremented until the hash of the new genesis block when including the nonce matches the hash value of the last block from the set of blocks that is to be replaced. While some embodiments are described with having a nonce to be included in the new genesis block, where the nonce enables the hash value of the new genesis block to satisfy a predetermined condition, in other embodiments the new genesis block is generated based on other criteria (e.g., a variable number of transactions can be included until the hash value of the new genesis block matches the hash value of the last block of the set of blocks that is to be replaced).

The match module 135A is operative to determine that the first hash value of the new genesis block 140 matches the second hash value of the last block 110N. In some embodiments, determining that a match occurs includes determining that a first set of n consecutive digits of the first hash value equals a second set of n consecutive digits of the second hash value. For example, the last n digits of the first hash value are equal to the last n digits of the second hash value, which is "10005F" in the illustrated example 122M of FIG. 1A. The number of consecutive digits that need to match contributes to establishing the complexity of generation of the new genesis block and is selected such that the complexity of the generation of the new genesis block is greater than the cumulative complexity of the generation of the blocks that the new genesis block is to replace. In some embodiments, another set of consecutive digits can be selected without departing from the scope of the present invention.

In one embodiment, the generation of the new genesis block may include adding to the new genesis block 140 a set of one or more transactions 142 from the first set of blocks 110A-N. In some embodiments, the set of transactions includes at least one transaction from each block from the first set of blocks 110A-N. In other embodiments, the transactions are selected from a subset of the blocks 110A-N, where the subset of the blocks is less than all the blocks 110A-N. For example, in the illustrated example transactions 111N-112N are selected from block 110N, transaction 111B is selected from block 110B and no transaction is selected from the current genesis block 110A. In some embodiments, more than one transaction can be selected from a single block to be included in the genesis block. In other alternative embodiments, no transaction is selected, and the new genesis block does not include any transactions.

In the embodiments, where the new genesis block includes a set of transactions, the number of transactions can be determined based on multiple embodiments. For example, the number of transactions added in the new genesis block 140 can be a number predefined by the blockchain network 101 such that for each new genesis block generated, the same number of transactions is selected to be included in it.

Alternatively, the number of transactions can be dynamically determined by the blockchain node 130A generating the new genesis block. For example, this can depend on the number of blocks that are to be replaced or on the number of transactions included in each block that is to be replaced. In these embodiments, the generation of the new genesis block further includes determining a number of transactions to be added in the new genesis block; and determining that the number of transactions of the new genesis block is compliant with a policy of the blockchain network. The policy of the blockchain network for the generation of genesis blocks (or more generally of blocks) determines that a block may not include more than a given number of transactions. Thus, in these embodiments, the number of transactions to be included in a new genesis block cannot exceed that number set for the blockchain network.

In some embodiments, the number of transactions also needs to be greater than a given threshold value be it determined by the blockchain network or dynamically determined by each blockchain node in the network. For example, the number of transactions to be included in the new genesis block can be greater than one hundred transactions.

In some embodiments, the number of blocks in the first set of blocks that is a number predefined by the blockchain network. This number is the same each time a blockchain node attempts to generate a new genesis block. For example, the number of blocks can be one hundred, two hundred, or any other number of blocks that the blockchain node can replace with a new genesis block. In other embodiments, the number of blocks is dynamically determined by the blockchain node generating the new genesis block 140. In these embodiments, generating the new genesis block 140 includes determining a number of blocks from the blockchain to be included in the first set of blocks. In some embodiments, the number of blocks in the first set of blocks (determined dynamically or not) is greater than a minimum number of blocks that can be replaced in the blockchain network.

Once the new genesis block 140 is determined, it is transmitted to one or more blockchain nodes (e.g., blockchain nodes 130B-N) of the blockchain network 101. For example, the new genesis block 140 is transmitted to blockchain nodes 130B-N through the network 105. The blockchain nodes 130B-N validates the new genesis block 140 and if the new genesis block is valid, replaces the set of blocks with the new genesis block as it will be described in further details with respect to FIG. 1B. In some embodiments, the blockchain node 130A transmits the new genesis block 140 to all blockchain nodes of the blockchain system. In other embodiments, the blockchain node 130A transmits the new genesis block 140 to a subset of the blockchain nodes in the blockchain system. In some embodiments, replacing the set of blocks with the new genesis block includes adding the new genesis block to the blockchain (e.g., by linking the new genesis block to the first block that is not to be replaced (e.g., block 110M)) and the blocks that are to be replaced (blocks 110A-N) become part of an 'old fork' in the blockchain 100. These blocks become stale blocks and can be removed once the chain of blocks has progressed enough.

In some embodiments, the new genesis block 140 is transmitted to the blockchain nodes 130B-N in a transaction message 170. The transaction message 170 includes the new genesis block 140 and an indication 172 of the number of blocks in the first set of blocks that are to be replaced by the new genesis block. In the embodiments, where the blockchain node 130A dynamically determines the number of blocks to replace, the transaction message includes this information such that any blockchain node receiving the new genesis block in the transaction message, also receives an indication of the number of blocks that the new genesis block is to replace. In some embodiments, the transaction message 170 may further include an identification of the block that the new genesis block 140 needs to be attached to.

For example, if the blockchain includes an additional block 110M, the transaction message includes the identification of this block and an indication that the new genesis block 140 is to be linked to block 110M. In some embodiments, the transaction message 170 may further include an indication that the block transmitted is a genesis block and not a regular block to be added to the chain. A new genesis block is to replace at least two blocks already present in the blockchain as opposed to a regular block that is to be added to the blockchain.

In some embodiments, the new genesis block 140 is to replace a first set of blocks 110A-110N and the blockchain includes a second set of blocks including one or more blocks (e.g., block 110M). In these embodiments, prior to replacing the first set of blocks 110A-N with the new genesis block 140, a first block 110M from the second set of blocks is linked to the last block 110N from the first set of blocks 110A-N, and following the replacement of the first set of blocks 110A-N with the new genesis block 140, the first block 110M from the second set of blocks is linked to the new genesis block 140. In alternative embodiments, the new genesis block is used to replace all the blocks present in the blockchain and there is no block remaining in the blockchain that is to be linked with the new genesis block. In these embodiments, a new block will be linked to the new genesis block once it is generated.

Figure 1B:
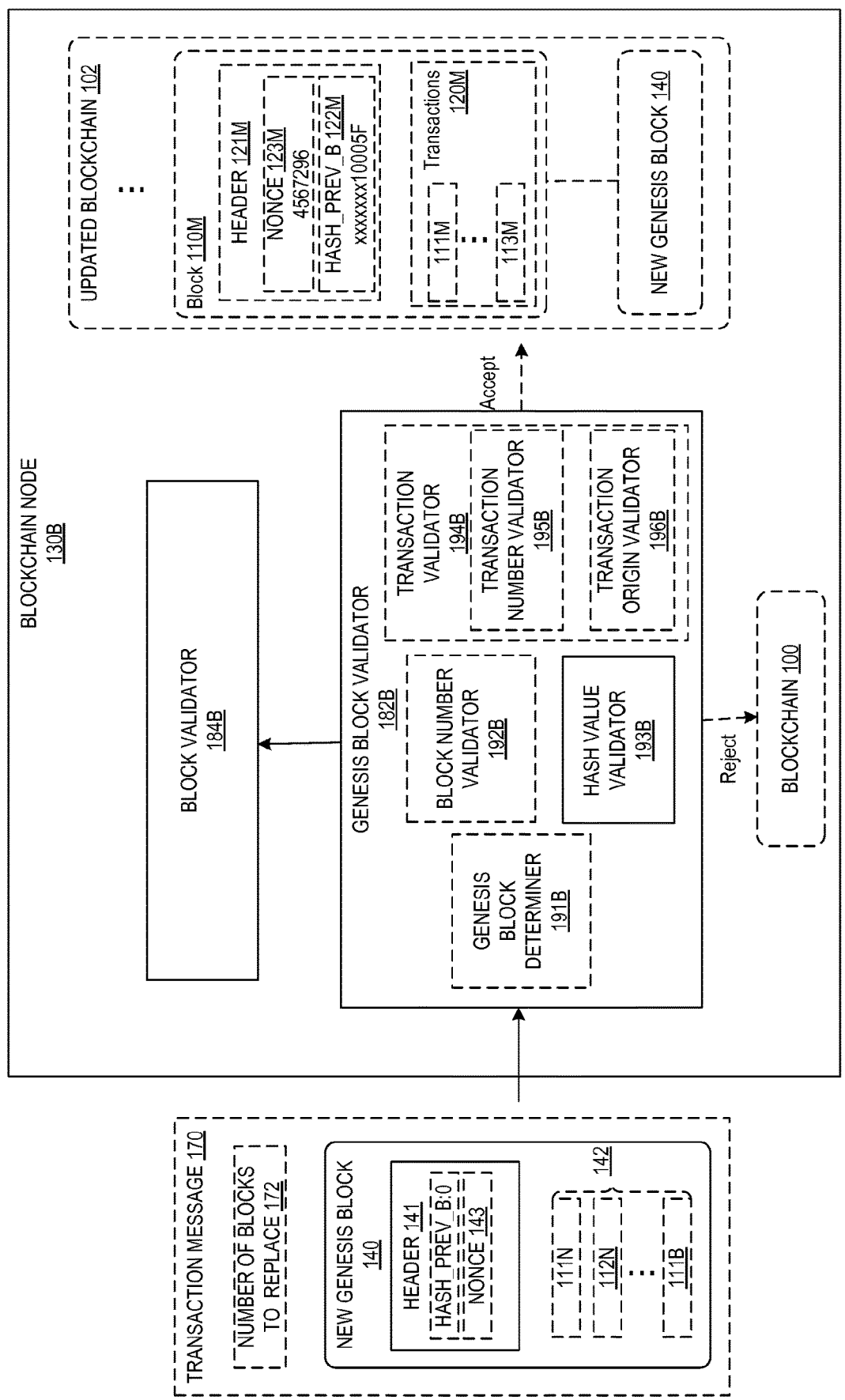
FIG. 1B illustrates a block diagram of an exemplary blockchain network in which validation of a new genesis block is enabled, in accordance with some embodiments.

FIG. 1B illustrates a block diagram of an exemplary blockchain network in which validation of a new genesis block is enabled, in accordance with some embodiments. Once the new genesis block is generated (e.g., new genesis block 140), and transmitted through a network 105 to other blockchain nodes. These nodes receive the new block 140 and perform the operations described with reference to FIG. 1B. The operations are described with respect to blockchain node 130B but one of ordinary skill in the art would understand that all blockchain nodes receiving the new genesis block 140 may validate the block.

The blockchain node 130B receives a new block. The genesis block determiner 191B of the blockchain node 130B determines whether the new block is a new genesis block. In some embodiments, the new block is received in a transaction message that includes an indication of a number of blocks that are to be replaced by the new genesis block. In some embodiments, the determination that the block is a new genesis block is performed by determining that the transaction message carrying the new genesis block includes the indication of the number of blocks to be replaced. In another embodiment, the transaction message may include a parameter indicating that the new genesis block is a genesis block as opposed to a regular block. In this embodiment, the determination that the block is a new genesis block is performed based on this parameter.

When the genesis block determiner 191B determines that the new block is not a new genesis block, the block is forwarded to the block validator 184B that determines if the received block is a valid normal block according to standard blockchain validation mechanisms.

When the genesis block determiner 191B determines that the new block is a new genesis block, the block number validator 192B determines whether the number of blocks in the first set of blocks that is to be replaced by the received block is greater than a predefined number of blocks. In some embodiments, the predefined number of blocks can be a number of blocks that allows adding complexity to the mechanism of generation of the new genesis block and allows the blockchain system to accept new genesis blocks only to replace a minimum number of blocks. For example, the minimum number of blocks to be replaced can be one hundred, one thousand, or any number of blocks that is set by the blockchain system. In some embodiments, the determination of whether the number of blocks to be replaced by the new genesis block received is performed by comparing the indication of a number of blocks to be replaced in the transaction message with a minimum number of blocks set for the blockchain system. In some embodiments, the verification of this condition is inexistent and block number validator 192B is not present in the genesis block validator 182B. For example, when the number of blocks to be replaced is always fixed in the blockchain system, any new genesis block received is set to replace the fixed number of blocks and there is no need to verify whether the number of blocks to be replaced is greater than a minimum number of blocks. When it is determined that the number of blocks to be replaced is smaller than the minimum number of blocks, the new block is rejected by the blockchain node and is not added to the blockchain. When it is determined that the number of blocks to be replaced is greater than the minimum number of blocks, the new block is evaluated further.

The hash value validator 193B determines whether the difficulty for generating the new genesis block is greater than the cumulative difficulty for generating blocks of the first set of blocks. In some embodiments, determining that the difficulty of generating the new genesis block is greater than the cumulative difficulty for generating blocks of the first set of blocks is performed by checking a number of digits with a value of zero, the hash value of the new genesis block has when compared with a number of digits that the blocks to be replaced have with a value of zero. When it is determined that the difficulty for generating the new block is not greater than the cumulative difficulty for generating blocks of the first set of blocks, the new block is rejected by the blockchain node 130B and it is not added to the blockchain. When it is determined that the difficulty for generating the new block is greater than the cumulative difficulty for generating blocks of the first set of blocks, the hash value validator 193B determines whether a hash value of the new block matches a hash value of a last block from the set of blocks to be replaced.

The hash value validator 193B further determines whether a hash of the new block 140 matches a hash of a last block 110N from the set of blocks to be replaced. In some embodiments, determining that the first hash value of the new genesis block 140 matches the second hash value of the last block 110N includes determining that a first set of n consecutive digits of the first hash value equals a second set of n consecutive digits of the second hash value. For example, the last n digits of the first hash value are equal to the last n digits of the second hash value, which is "10005F" in the illustrated example 122M of FIG. 1A. The number of consecutive digits that need to match enable to determine the complexity of generation of the new genesis block and is selected such that the complexity of the generation of the new genesis block is greater than the cumulative complexity of the generation of the blocks that the new genesis block is to replace. In some embodiments, another set of consecutive digits can be selected without departing from the scope of the present invention.

When it is determined that a hash of the new block does not match a hash of a last block from the set of blocks to be replaced, the new genesis block is rejected by the blockchain node 130B and is not added to the blockchain 100. When it is determined that a hash of the new block matches a hash of a last block from the set of blocks to be replaced, additional criteria can be used to determine whether the new block is a valid new genesis block. In some embodiments, upon determining that the complexity criteria and the hash value criteria are satisfied for the new block, this block is validated and accepted as a new genesis block for the blockchain 100. In other embodiments, the additional criteria are verified prior to accepting this block as the new genesis block.

In the embodiments where the new genesis block is generated to include a set of transactions, the transaction validator 194B evaluates the new block. The transaction validator 194B includes a transaction number validator 195B and a transaction origin validator 196B. The transaction number validator 195B determines whether the new genesis block includes a set of transactions and whether the number of transactions in the set of transactions is greater than a predetermined number. The predetermined number is a minimum number of transactions that need to be included in the new genesis block for this block to be considered valid.

The transaction number validator 195B can also determine that the number of transactions of the new genesis block is compliant with a policy of the blockchain network. The policy of the blockchain network for the generation of genesis blocks (or more generally of blocks) determines that a block may not include more than a given number of transactions. Thus, in these embodiments, the number of transactions included in a new genesis block cannot exceed that number set for the blockchain network. Therefore, in some embodiments, the blockchain node 130B may determine whether the number of transactions included the new genesis block is greater than a predetermined number for a genesis block and whether the number of transactions is less than a given number of transactions to satisfy a policy of the blockchain network for transactions added to blocks.

In the embodiments where the new genesis block is to include transactions, when it is determined that the new genesis block does not include transactions or that the number of transactions in the set of transactions is not greater than the predetermined number, the new genesis block is rejected by the blockchain node 130B and is not added to the blockchain. Alternatively, when it is determined that the new genesis block includes transactions and that the number of transactions is greater than the predetermined number, the block is evaluated by the transaction origin validator 196B.

The transaction origin validator 196B determines whether the transactions included in the new genesis block belong to at least one of the blocks from the first set of blocks that are to be replaced by the genesis block. The transaction origin validator 196B has access to the blocks that are to be replaced and can make the determination by evaluating the transactions included in the blocks and comparing them with the transactions of the new genesis block. In some embodiments, the transaction origin validator 196B determines whether the set of transactions includes at least one transaction from each block from the first set of blocks 110A-N. In other embodiments, the transaction origin validator 196B determines whether the transactions are selected from a subset of the blocks 110A-N, where the subset of the blocks is less than all the blocks 110A-N. In other embodiments, the transaction origin validator 196B can determine that more than one transaction is selected from a single block.

Once the criteria for determining whether the block is a new genesis block are satisfied, the first set of blocks is replaced with the new block 140 causing the new block to become a new genesis block for the blockchain. In some embodiments, for the new block 140 to be determined a new genesis block for the blockchain and replace the set of blocks all the criteria described above with reference to the genesis block determiner 191B, the block number validator 192B, the hash value validator 193B, and the transaction validator 194B need to be satisfied. In other embodiments, for the new block to be determined a new genesis block for the blockchain and replace the set of blocks at least the conditions described with reference to the hash value validator 193B need to be satisfied. In other embodiments, a combination of criteria from the multiple modules can be used in addition to the criteria evaluated by the hash value validator 193B to determine whether the new block is a new genesis block for the blockchain 100.

When a new genesis block 140 satisfies the criteria described with reference to one or more of the embodiments above, the new genesis block 140 can be accepted by consensus into the blockchain 100 by the different blockchain nodes (130A-N). The generation of the new genesis block 140 described herein is computational expensive. In some embodiments, replacing the set of blocks with the new genesis block includes adding the new genesis block to the blockchain (e.g., by linking the new genesis block to the first block that is not to be replaced (e.g., block 110M)) and the blocks that are to be replaced (blocks 110A-N) become part of an 'old fork' in the blockchain 100. These blocks become stale blocks and can be removed once the chain of blocks has progressed enough.

In some embodiments, there is a possibility that two genesis blocks are accepted into the blockchain, creating forks. The way of accepting one genesis block instead of another is performed through a similar mechanism as the one used in the fork selection process for regular block in the blockchain. In one embodiment, the fork with the most computational difficulty is accepted by the nodes.

While the embodiments herein may have been described at least in part with respect to blockchain systems based on Proof of Work (PoW) consensus mechanisms, other types of consensus mechanisms can be used without departing from the scope of the present invention.

The embodiments described herein present a solution where a new genesis block is generated to replace a set of two or more blocks in the blockchain. The techniques proposed herein solve the bloat problem by replacing N blocks and a current genesis block of the blockchain with a new genesis block. In some embodiments, the new genesis block contains a fraction of all transactions stored in those N blocks. This reduces the size of the blockchain and can keep its length bounded to a fixed number of total blocks. The solution presented herein eliminates the oldest information stored in the blockchain and use the consensus mechanism to generate and add a new genesis block. The new genesis block is added based on a mechanism that allows peers in the blockchain network to verify its validity.

The embodiments of the solution described above have several advantages when compared with existing techniques for reducing the size of a blockchain. The solution reduces the size of a blockchain, making the blockchain more suitable for scenarios involving constrained devices. For example, the solution can be used in networks including network devices with limited capabilities such that devices used in Internet of Things (IoT) environments. These devices are no longer required to store the unlimited growing blockchain. Instead the network can regularly reduce the size of the blockchain by having a node generate a new genesis block when a given size of the blockchain is reached. In contrast to the existing solutions, the solution does not require updates or modifications of the operations of the blockchain nodes. The new genesis block is automatically generated and accepted based on a validation mechanism and does not partition the blockchain network. Another advantage of the solution is that it offers a high level of scalability which results in a better performance when exchanging the information between the blockchain nodes, improving storage capabilities and bandwidth. In addition, the proposed solution proposed allows node in the blockchain network acting as a miner to trigger the creation of a new node in the blockchain at any time. This is a clear advantage when compared to the other existing solutions. Thus, as opposed to the existing solutions the operations performed for reducing the size can be performed at any point in time.

The operations in the flow diagrams will be described with reference to the exemplary embodiments of FIGS. 1A-B. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

FIG. 2 illustrates a flow diagram of exemplary operations for reducing the size of a blockchain, in accordance with some embodiments. The blockchain 100 includes a first set of two or more blocks 110A-110M including a current genesis block 110A. The current genesis block 110A can be a genesis block generated when the blockchain is first initialized. In other words, the genesis block can be the initial genesis block of the blockchain. Alternatively, the current genesis block 110A can be a genesis block that previously replaced a set of two or more blocks from the blockchain according to the mechanisms described with reference to the operations described with reference to one or a combination of FIGS. 1A, 2-5. The operations of FIG. 2 can be performed by a blockchain node (e.g., blockchain node 130A) implemented in a network device.

At operation 210, a new genesis block for the blockchain is generated. The new genesis block is such that a first hash value resulting from hashing the new genesis block matches a second hash value resulting from hashing a last block from the first set of blocks, and the difficulty of determining the first hash value is computationally greater than the cumulative difficulty of determining hash values of all blocks in the first set of blocks. For example, with reference to FIG. 1A, the new genesis block 140 is generated. A hash value resulting from hashing the new genesis block 140 matches a second hash value resulting from hashing the last block 110N from the first set of blocks 110A-N. In addition, the difficulty of determining the first hash value of the new genesis block 140 is computationally greater than the cumulative difficulty of determining hash values of all blocks 110A-N in the first set of blocks.

The generation of the new genesis block is performed according to one or more embodiments described with reference to FIGS. 3, 4, and 5. While the generation of the new genesis block can be performed based on the embodiments described herein with reference to FIGS. 3-5, in other embodiments, the generation of the new genesis block can be performed based on other mechanisms.

FIG. 3 illustrates a flow diagram of exemplary operations for generating a new genesis block, in accordance with some embodiments. For example, the generation of the new genesis block of operation 210 may include adding to the new genesis block a set of one or more transactions from the first set of blocks (operation 310).

In some embodiments (operation 315), the set of one or more transactions includes at least one transaction from each block from the first set of blocks 110A-N. In other embodiments, the transactions are selected from a subset of the blocks 110A-N, where the subset of the blocks is less than all the blocks 110A-N. In some embodiments, more than one transaction can be selected from a single block to be included in the genesis block. In other alternative embodiments, no transaction is selected, and the new genesis block does not include any transactions.

In the embodiments, where the new genesis block includes a set of transactions, the number of transactions can be determined based on multiple embodiments. For example, (operation 320), the number of transactions added in the new genesis block can be a number predefined by the blockchain network such that for each new genesis block generated, the same number of transactions is selected to be included in it.

Alternatively, in another embodiment, the number of transactions can be dynamically determined by the blockchain node generating the new genesis block. In these embodiments, the generation of the new genesis block further includes determining (operation 325) a number of transactions to be added in the new genesis block; and determining (operation 330) that the number of transactions of the new genesis block is compliant with a policy of the blockchain network. The policy of the blockchain network for the generation of genesis blocks (or more generally of blocks) determines that a block may not include more than a given number of transactions. Thus, in these embodiments, the number of transactions to be included in a new genesis block cannot exceed that number set for the blockchain network.

In some embodiments, the number of transactions also needs to be greater than a given threshold value be it determined by the blockchain network or dynamically determined by each blockchain node in the network. For example, the number of transactions to be included in the new genesis block can be greater than a one hundred transactions.

FIG. 4 illustrates a flow diagram of exemplary operations for generating a new genesis block, in accordance with some embodiments. In some embodiments, the generation of the new genesis block is performed by varying a nonce value to obtain a desired outcome for the hash value of the new genesis block. The generation of the new genesis block includes: determining a nonce (operation 410); hashing the new genesis block including the nonce to obtain the first hash value (operation 415); and determining that the first hash value resulting from the hashing of the new genesis block with the nonce matches the second hash value that results from the hashing of the last block 110N of the set of block that is to be replaced (operation 420). The nonce is typically a parameter that is varied by the blockchain node until the conditions for generation of the new genesis block is obtained. For example, the nonce can be a value starting at an initial value (e.g., 0) and incremented until the hash of the new genesis block when including the nonce matches the hash value of the last block from the set of blocks that is to be replaced. While some embodiments are described with having a nonce to be included in the new genesis block, where the nonce enables the hash value of the new genesis block to satisfy a predetermined condition, in other embodiments the new genesis block is generated based on other criteria (e.g., a variable number of transactions can be included until the hash value of the new genesis block matches the hash value of the last block of the set of blocks that is to be replaced).

In some embodiments, determining (operation 420) that the first hash value of the new genesis block 140 matches the second hash value of the last block 110N includes determining (operation 425) that a first set of n consecutive digits of the first hash value equals a second set of n consecutive digits of the second hash value. For example, the last n digits of the first hash value are equal to the last n digits of the second hash value, which is "10005F" in the illustrated example 122M of FIG. 1A. The number of consecutive digits that need to match enable to determine the complexity of generation of the new genesis block and is selected such that the complexity of the generation of the new genesis block is greater than the cumulative complexity of the generation of the blocks that the new genesis block is to replace. In some embodiments, another set of consecutive digits can be selected without departing from the scope of the present invention.

FIG. 5 illustrates a flow diagram of exemplary operations for generating a new genesis block according to some embodiments. In some embodiments, the number of blocks in the first set of blocks that is a number predefined by the blockchain network (operation 510). This number is the same each time a blockchain node attempts to generate a new genesis block. For example, the number of blocks can be 100, 200, or any other number of blocks that the blockchain node can replace with a new genesis block.

In other embodiments, the number of blocks is dynamically determined by the blockchain node generating the new genesis block. In these embodiments, generating the new genesis block includes determining (at operation 520) a number of blocks from the blockchain to be included in the first set of blocks.

In some embodiments, the number of blocks in the first set of blocks (determined dynamically or not) is greater than a minimum number of blocks that can be replaced in the blockchain network (operation 525).

Returning to FIG. 2, at operation 220, the new genesis block is transmitted to one or more blockchain nodes of a blockchain network. For example, the new genesis block 140 is transmitted to blockchain nodes 130B-N through the network 105. At operation 230, the first set of blocks 110A-N is replaced with the new genesis block. In some embodiments, the set of blocks includes two or more blocks of the blockchain 100. In some embodiments, the set of blocks needs to be greater than a predetermined number of blocks (e.g., 100, 1000, etc.) prior to the blockchain node generates the new genesis block. In some embodiments, replacing the set of blocks with the new genesis block includes adding the new genesis block to the blockchain (e.g., by linking the new genesis block to the first block that is not to be replaced (e.g., block 110M)) and the blocks that are to be replaced (blocks 110A-N) become part of an 'old fork' in the blockchain 100. These blocks become stale blocks and can be removed once the chain of blocks has progressed enough.

In some embodiments, transmitting the new genesis block includes transmitting a transaction message that includes the new genesis block and an indication of the number of blocks in the first set of blocks that are to be replaced by the new genesis block. In the embodiments, where the blockchain node 130A dynamically determines the number of blocks to replace, the transaction message includes this information such that any blockchain node receiving the new genesis block in the transaction message, also receives an indication of the number of blocks that the new genesis block is to replace. In some embodiments, the transaction message may further include an identification of the blocks that is to be attached to the new genesis block 140. For example, if the blockchain includes an additional block 110M, the transaction message includes the identification of this block and an indication that the new genesis block 140 is to be linked to block 110M. In some embodiments, the transaction message 170 may further include an indication that the block transmitted is a genesis block and not a regular block to be added to the chain. A new genesis block is to replace at least two blocks already present in the blockchain as opposed to a regular block that is to be added to the blockchain.

In some embodiments, the new genesis block 140 is to replace a first set of blocks 110A-110N and the blockchain includes a second set of blocks including one or more blocks (e.g., block 110M). In these embodiments, prior to replacing the first set of blocks 110A-N with the new genesis block 140, a first block 110M from the second set of blocks is linked to the last block 110N from the first set of blocks 110A-N, and following the replacement of the first set of blocks 110A-N with the new genesis block 140, the first block 110M from the second set of blocks is linked to the new genesis block 140. In alternative embodiments, the new genesis block is used to replace all the blocks present in the blockchain and there is no block remaining in the blockchain that is to be linked with the new genesis block. In these embodiments, a new block will be linked to the new genesis block once it is generated.

Figure 6:
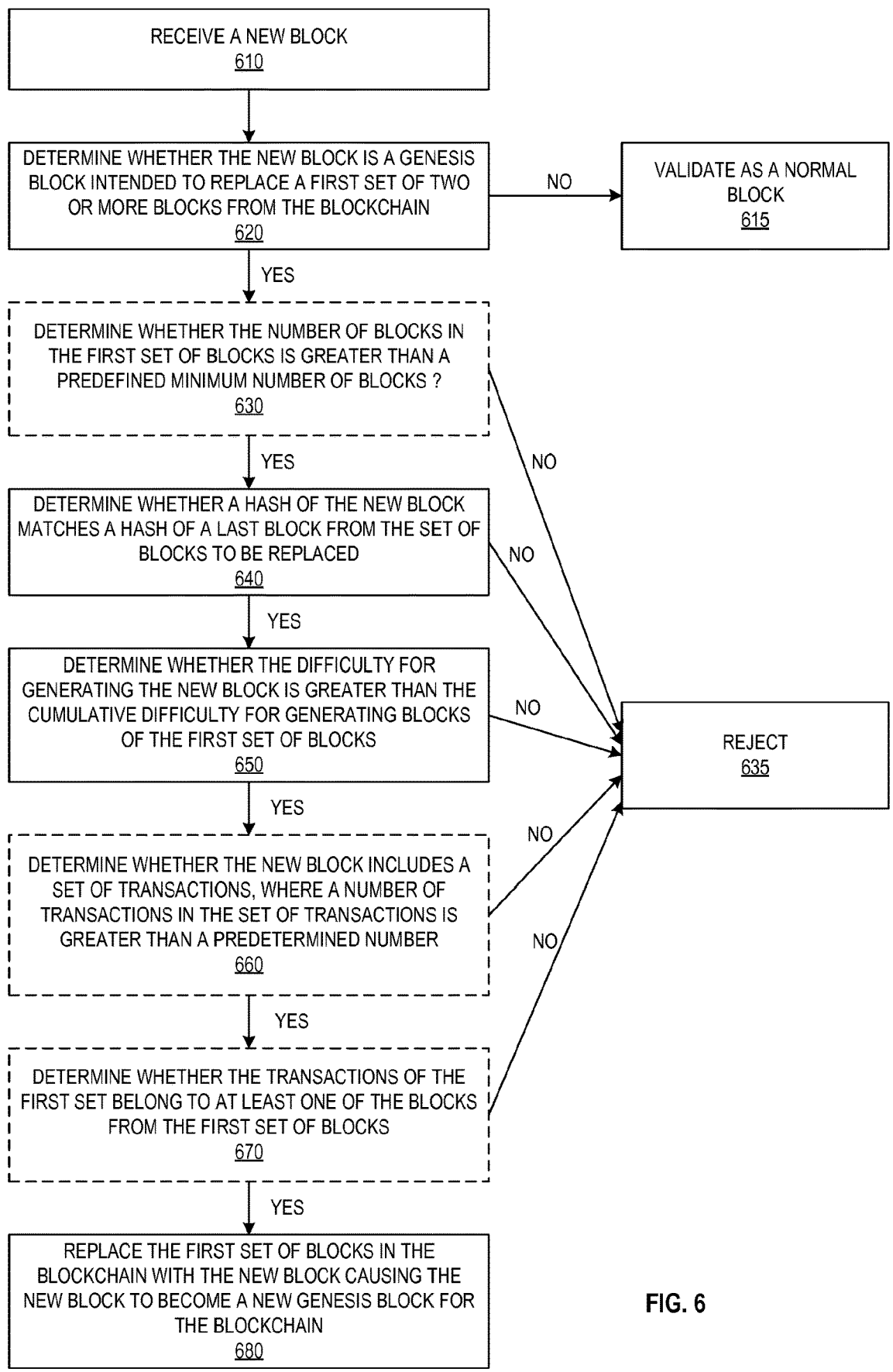
FIG. 6 illustrates a flow diagram of exemplary operations for validating a new genesis block, in accordance with some embodiments.

FIG. 6 illustrates a flow diagram of exemplary operations for validating a new genesis block, in accordance with some embodiments. Once the new genesis block is generated (e.g., new genesis block 140), and transmitted through a network to other blockchain nodes. These nodes receive the new block 140 and perform the operations of FIG. 6. For example, these operations can be performed by blockchain node 130B.

At operation 610, the blockchain node 130B receives a new block. At operation 620, the blockchain node determines whether the new block is a new genesis block intended to replace a set of two or more blocks from the blockchain. In some embodiments, the new block is received in a message that includes an indication of a number of blocks that are to be replaced by the new genesis block. In some embodiments, the determination that the block is a new genesis block is performed by determining that the transaction message carrying the new genesis block includes the indication of the number of blocks to be replaced. In other embodiments, the transaction message may include a parameter indicating that the new genesis block is a genesis block as opposed to a regular block. In this embodiment, the determination that the block is a new genesis block is performed based on this parameter.

When the blockchain node 130B determines that the new block is not a new genesis block, the flow of operations moves to operation 615, at which the new block is validated as a normal block according to standard blockchain validation mechanisms.

When the blockchain node 130B determines that the new block is a new genesis block, the flow of operations moves to operation 630, at which the blockchain node determines whether the number of blocks in the first set of blocks is greater than a predefined number of blocks. In some embodiments, the predefined number of blocks can be a number of blocks that allows adding complexity to the mechanism of generation of the new genesis block and allows the blockchain system to accept new genesis blocks only to replace a minimum number of blocks. For example, the minimum number of blocks to be replaced can be one hundred, one thousand, or any number of blocks that is set by the blockchain system. The determination of whether the number of blocks to be replaced by the new genesis block received is performed by comparing the indication of the number of blocks to be replaced in the transaction message with a minimum number of blocks set for the blockchain system. In some embodiments, the verification of this condition is inexistent and the operation 630 is skipped such that the flow of operations moves from operation 615 to operation 640. For example, when the number of blocks to be replaced is always fixed in the blockchain system, any new genesis block receive is set to replace the fixed number of blocks and there is no need to verify whether the number of blocks to be replaced is greater than a minimum number of blocks. When it is determined that the number of blocks to be replaced is smaller than the minimum number of blocks, the flow of operations moves to operation 635, at which the new genesis block is rejected by the blockchain node and is not added to the blockchain. When it is determined that the number of blocks to be replaced is greater than the minimum number of blocks, the flow of operations moves to operation 640.

At operation 640, the blockchain node 130B determines whether a hash of the new block matches a hash of a last block from the set of blocks to be replaced. When it is determined that a hash of the new block does not match a hash of a last block from the set of blocks to be replaced, the flow of operations moves to operation 635, at which the new genesis block is rejected by the blockchain node 130B and is not added to the blockchain 100. When it is determined that a hash of the new block matches a hash of a last block from the set of blocks to be replaced, the flow of operations moves to operation 650.

At operation 650 the blockchain node 130B determines whether the difficulty for generating the new genesis block is greater than the cumulative difficulty for generating blocks of the first set of blocks. In some embodiments, determining that the difficulty of generating the new genesis block is greater than the cumulative difficulty for generating blocks of the first set of blocks is performed by checking a number of digits with a value of zero, the hash value of the new genesis block has when compared with a number of digits that the blocks to be replaced have with a value of zero. When it is determined that the difficulty for generating the new block is not greater than the cumulative difficulty for generating blocks of the first set of blocks, the flow of operations moves to operation 635, at which the new genesis block is rejected by the blockchain node and is not added to the blockchain. When it is determined that the difficulty for generating the new block is greater than the cumulative difficulty for generating blocks of the first set of blocks, the flow of operations moves to operation 660.

In the embodiments where the new genesis block is generated to include a set of transactions, the blockchain node 130B is operative to perform operation 660. In the embodiments where no transaction is added to the new genesis block when generated, the operation 660 is skipped and the flow of operations moves from operation 650 to 670.

At operation 660, the blockchain node 130B determines whether the new genesis block includes a set of transactions and whether the number of transactions in the set of transactions is greater than a predetermined number. The predetermined number is a minimum number of transactions that need to be included in the new genesis block for this block to be considered valid.

In some embodiments, the blockchain node 130B further determines that the number of transactions of the new genesis block is compliant with a policy of the blockchain network. The policy of the blockchain network for the generation of genesis blocks (or more generally of blocks) determines that a block may not include more than a given number of transactions. Thus, in these embodiments, the number of transactions to be included in a new genesis block cannot exceed that number set for the blockchain network. Therefore, in some embodiments, the blockchain node 130B may determine whether the number of transactions included in the new genesis block is greater than a predetermined number for a genesis block and whether the number of transactions is less than a given number of transactions to satisfy a policy of the blockchain network for transactions added to blocks.

In the embodiments where the new genesis block is to include transactions, when it is determined that the new genesis block does not include transactions or that the number of transactions in the set of transactions is not greater than the predetermined number, the flow of operations moves to operation 635. At operation 635, the new genesis block is rejected by the blockchain node and is not added to the blockchain. Alternatively, when it is determined that the new genesis block includes transactions and that the number of transactions is greater than the predetermined number, the flow of operations moves to operation 670.

At operation 670, the blockchain node 130B determines whether the transactions included in the new genesis block belong to at least one of the blocks from the first set of blocks that are to be replaced by the genesis block. The blockchain node 130B has access to the blocks that are to be replaced and can make the determination by evaluating the transactions included in the blocks and comparing them with the transactions of the new genesis block. In some embodiments, the blockchain node 130B determines whether the set of transactions includes at least one transaction from each block from the first set of blocks 110A-N. In other embodiments, the blockchain node 130B determines whether the transactions are selected from a subset of the blocks 110A-N, where the subset of the blocks is less than all the blocks 110A-N. In other embodiments, the blockchain node 130B can determine that more than one transaction is selected from a single block.

In the embodiments where the new genesis block is generated to include a set of transactions, the blockchain node 130B is operative to perform operation 670. In the embodiments where no transaction is added to the new genesis block when generated, the operation 670 is skipped and the flow of operations moves from operation 650 to 680.

At operation 680, the first set of blocks is replaced with the new block causing the new block to become a new genesis block for the blockchain. In some embodiments, for the new block to be determined a new genesis block for the blockchain and replace the set of blocks the conditions of operations 620-670 need to be satisfied. In other embodiments, for the new block to be determined a new genesis block for the blockchain and replace the set of blocks at least the conditions of operations 620, 640, and 650 need to be satisfied. In other embodiments, a combination of the operations 620, 640, 650, and any one or more of operations 630, 660, and 670 need to be satisfied for the new block to be considered a new genesis block for the blockchain and for this block to replace a set of two or more blocks from the blockchain. In some embodiments, replacing the set of blocks with the new genesis block includes adding the new genesis block to the blockchain (e.g., by linking the new genesis block to the first block that is not to be replaced (e.g., block 110M)) and the blocks that are to be replaced (blocks 110A-N) become part of an 'old fork' in the blockchain 100. These blocks become stale blocks and can be removed once the chain of blocks has progressed enough.

The embodiments described herein present a solution where a new genesis block is generated to replace a set of two or more blocks in the blockchain. The techniques proposed herein solve the bloat problem by replacing N blocks and a current genesis block of the blockchain with a new genesis block. In some embodiments, the new genesis block contains a fraction of all transactions stored in those N blocks. This reduces the size of the blockchain and can keep its length bounded to a fixed number of total blocks. The solution presented herein eliminates the oldest information stored in the blockchain and use the consensus mechanism to generate and add a new genesis block. The new genesis block is added based on a mechanism that allows peers in the blockchain network to verify its validity.

The embodiments of the solution described above have several advantages when compared with existing techniques for reducing the size of a blockchain. The solution reduces the size of a blockchain, making the blockchain more suitable for scenarios involving constrained devices. For example, the solution can be used in networks including network devices with limited capabilities such that devices used in Internet of Things (IoT) environments. These devices are no longer required to store the unlimited growing blockchain. Instead the network can regularly reduce the size of the blockchain by having a node generate a new genesis block when a given size of the blockchain is reached. In contrast to the existing solutions, the solution does not require updates or modifications of the operations of the blockchain nodes. The new genesis block is automatically generated and accepted based on a validation mechanism and does not partition the blockchain network such that the blockchain keeps the accounts' transactions on the main chain. Another advantage of the solution is that it offers a high level of scalability which results in a better performance when exchanging the information between the blockchain nodes, improving storage capabilities and bandwidth. In addition, the proposed solution proposed allows node in the blockchain network acting as a miner to trigger the creation of a new node in the blockchain at any time. This is a clear advantage when compared to the other existing solutions. Thus, as opposed to the existing solutions the operations performed for reducing the size can be performed at any point in time.

Architecture:

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video, etc.).

Figure 7:
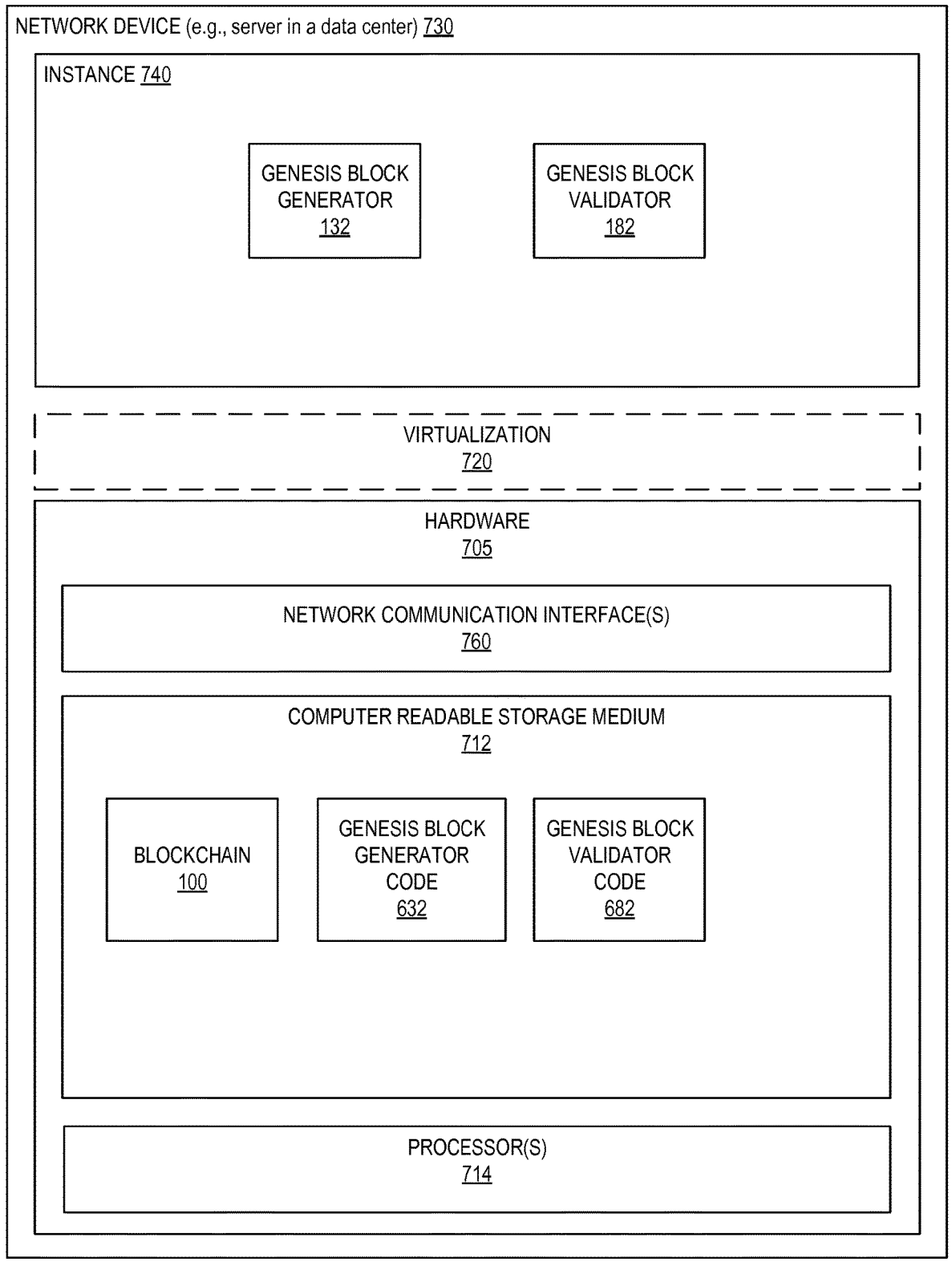
FIG. 7 illustrates a block diagram of a network device in which generation and/or validation of a new genesis block can be performed, in accordance with some embodiments.

FIG. 7 illustrates a block diagram of a network device in which generation and/or validation of a new genesis block can be performed, in accordance with some embodiments. According to one embodiment, the network device includes hardware 705. Hardware 705 includes network communication interfaces 760 coupled with a computer readable storage medium 712. The computer readable storage medium 712 may include a copy of a blockchain 100. The computer readable storage medium 712 may further include genesis block generator code 632 and genesis block validator code 682. The genesis block generator code 632 when executed on one or more processors 714 causes the network device to perform operations of a blockchain node for generating a new genesis block as described with reference to one or more of FIGS. 1A-6. The genesis block validator code 682 when executed on one or more processors 714 causes the network device to perform operations of a blockchain node for validating a block received as a new genesis block as described with reference to one or more of FIGS. 1A-6.

While one embodiment does not implement virtualization, alternative embodiments may use different forms of virtualization. For example, in one such alternative embodiment the virtualization layer 720 represents the kernel of an operating system (or a shim executing on a base operating system) that allows for the creation of multiple instances called software containers that may each be used to execute one (or more) of the sets of applications; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 720 represents a hypervisor (sometimes referred to as a virtual machine monitor (VMM)) or a hypervisor executing on top of a host operating system, and each of the sets of applications is run on top of a guest operating system within an instance 740 called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 705, directly on a hypervisor (in which case the unikernel is sometimes described as running within a LibOS virtual machine), or in a software container, embodiments can be implemented fully with unikernels running directly on a hypervisor represented by virtualization layer 720, unikernels running within software containers represented by instances, or as a combination of unikernels and the above-described techniques (e.g., unikernels and virtual machines both run directly on a hypervisor, unikernels and sets of applications that are run in different software containers).

The instantiation of the one or more sets of one or more applications, as well as virtualization if implemented, are collectively referred to as software instance(s). Each set of applications, corresponding virtualization construct if implemented, and that part of the hardware that executes them (be it hardware dedicated to that execution and/or time slices of hardware temporally shared), forms a separate virtual network element(s).

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for size reduction of a blockchain, wherein the blockchain includes a first set of two or more blocks including an initial genesis block, the method comprising:
generating a new genesis block for the blockchain, wherein a first hash value resulting from hashing the new genesis block matches a second hash value resulting from hashing a last block from the first set of blocks, wherein generating the new genesis block includes determining a nonce and hashing the new genesis block with the nonce to obtain the first hash value, the first hash value containing leading zeros that correspond to difficulty of determining the first hash value, and wherein the nonce is determined by nonce value incrementing to result in the first hash value matching the second hash value;
transmitting the new genesis block to one or more blockchain nodes of a blockchain network that store the first set of blocks, responsive to a determination that the difficulty of determining the first hash value is computationally greater than cumulative difficulty of determining hash values of all blocks in the first set of blocks, wherein the determination is based on checking a first number of leading zeros in the first hash value and a second number of leading zeros in the second hash value; and
replacing the first set of blocks with the new genesis block.

2. The method of claim 1, wherein responsive to determining that the blockchain includes a second set of blocks including one or more blocks:
a) prior to the replacing of the first set of blocks with the new genesis block, a first block from the second set of blocks is linked to the last block from the first set of blocks, and
b) following the replacing of the first set of blocks with the new genesis block, the first block from the second set of blocks is linked to the new genesis block.

3. The method of claim 2, wherein the generating the new genesis block further includes:
determining a number of transactions to be added in the new genesis block; and
determining that the number of transactions of the new genesis block is compliant with a policy of the blockchain network.

4. The method of claim 1, wherein the generating the new genesis block further includes adding to the new genesis block a set of one or more transactions from the first set of blocks.

5. The method of claim 4, wherein the set of transactions includes at least one transaction from each block from the first set of blocks.

6. The method of claim 1, wherein the determining that the first hash value matches the second hash value includes determining that a first set of N consecutive digits of the first hash value equals a second set of N consecutive digits of the second hash value.

7. The method of claim 1, wherein the number of blocks in the first set of blocks is a number predefined by the blockchain network.

8. The method of claim 1, wherein the generating the new genesis block further includes determining a number of blocks from the blockchain to be included in the first set of blocks, and wherein the transmitting the new genesis block to the one or more blockchain nodes includes transmitting a transaction message including the new genesis block and an indication of the number of blocks in the first set of blocks that are to be replaced by the new genesis block.

9. The method of claim 8, wherein the number of blocks in the first set of blocks is greater than a minimum number of blocks that can be replaced in the blockchain network.

10. An apparatus for size reduction of a blockchain, wherein the blockchain includes a first set of two or more blocks including an initial genesis block, the apparatus comprising:
one or more processors; and
a computer memory storing a set of computer readable instructions that when executed by the one or more processors cause the apparatus to:
generate a new genesis block for the blockchain, wherein a first hash value resulting from hashing the new genesis block matches a second hash value resulting from hashing a last block from the first set of blocks, wherein generating the new genesis block includes determining a nonce and hashing the new genesis block with the nonce to obtain the first hash value, the first hash value containing leading zeros that correspond to difficulty of determining the first hash value, and wherein the nonce is determined by nonce value incrementing to result in the first hash value matching the second hash value;
transmit the new genesis block to one or more blockchain nodes of a blockchain network that store the first set of blocks, responsive to a determination that the difficulty of determining the first hash value is computationally greater than cumulative difficulty of determining hash values of all blocks in the first set of blocks, wherein the determination is based on checking a first number of leading zeros in the first hash value and a second number of leading zeros in the second hash value; and
replace the first set of blocks with the new genesis block.

11. The apparatus of claim 10, wherein responsive to determine that the blockchain includes a second set of blocks including one or more blocks:
a) prior to replacing the first set of blocks with the new genesis block, a first block from the second set of blocks is linked to the last block from the first set of blocks, and
b) following the replacing of the first set of blocks with the new genesis block, the first block from the second set of blocks is linked to the new genesis block.

12. The apparatus of claim 10, wherein to generate the new genesis block further includes to add to the new genesis block a set of one or more transactions from the first set of blocks.

13. The apparatus of claim 12, wherein the set of transactions includes at least one transaction from each block from the first set of blocks.

14. The apparatus of claim 12, wherein to generate the new genesis block further includes to:
determine a number of transactions to be added in the new genesis block; and
determine that the number of transactions of the new genesis block is compliant with a policy of the blockchain network.

15. The apparatus of claim 10, wherein to determine that the first value matches the second hash value includes to determine that a first set of N consecutive digits of the first hash value equals a second set of N consecutive digits of the second hash value.

16. The apparatus of claim 10, wherein the number of blocks in the first set of blocks is a number predefined by the blockchain network.

17. The apparatus of claim 10, wherein to generate the new genesis block further includes to determine a number of blocks from the blockchain to be included in the first set of blocks, and wherein to transmit the new genesis block to the one or more blockchain nodes includes to transmit a transaction message including the new genesis block and an indication of the number of blocks in the first set of blocks that are to be replaced by the new genesis block.

18. The apparatus of claim 17, wherein the number of blocks in the first set of blocks is greater than a minimum number of blocks that can be replaced in the blockchain network.

* * * * *